(12) United States Patent
Jornod et al.

(10) Patent No.: US 11,485,361 B2
(45) Date of Patent: Nov. 1, 2022

(54) METHOD, COMPUTER PROGRAM, AND APPARATUS FOR ADAPTING A SPEED OF VEHICLES IN A PLATOON, VEHICLE, TRAFFIC CONTROL ENTITY

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 156 days.

(21) Appl. No.: 17/014,378

(22) Filed: Sep. 8, 2020

(65) Prior Publication Data
US 2021/0070292 A1 Mar. 11, 2021

(30) Foreign Application Priority Data

Sep. 9, 2019 (EP) .................................. 19196178

(51) Int. Cl.
*B60W 30/16* (2020.01)
*B60W 60/00* (2020.01)
(Continued)

(52) U.S. Cl.
CPC ........ *B60W 30/162* (2013.01); *B60W 30/165* (2013.01); *B60W 60/0018* (2020.02);
(Continued)

(58) Field of Classification Search
None
See application file for complete search history.

(56) References Cited

U.S. PATENT DOCUMENTS 10,429,199 B2 10/2019 Mason et al.
2010/0256852 A1 10/2010 Mudalige
(Continued)

FOREIGN PATENT DOCUMENTS

CN 102859323 A 1/2013
CN 105957335 A 9/2016
(Continued)

OTHER PUBLICATIONS

3GPP TSG-SA WG1 Meeting #83; LS on Requirements to enable Predictive QoS for Automotive industry; Aug. J018; West Palm Beach, Florida, (Year: 2018).*
(Continued)

*Primary Examiner* — Maceeh Anwari
*Assistant Examiner* — Jacob Daniel Underbakke
(74) *Attorney, Agent, or Firm* — Barnes & Thornburg, LLP

(57) ABSTRACT

A transportation vehicle, a traffic control entity, a method, a computer program, and an apparatus for adapting a speed of transportation vehicles in a platoon. The method for adapting a speed of transportation vehicles in a platoon includes obtaining information related to a future course of required minimum inter-vehicular distances of the transportation vehicles of the platoon. The method also includes adapting a speed of the transportation vehicles of the platoon based on the information related to the future course of the required minimum inter-vehicular distances and a fuel consumption of the transportation vehicles of the platoon.

19 Claims, 9 Drawing Sheets

(51) Int. Cl.
  *B60W 30/165* (2020.01)
  *G05D 1/02* (2020.01)
  *H04W 28/24* (2009.01)
  *H04W 72/08* (2009.01)
  *H04W 4/46* (2018.01)

(52) U.S. Cl.
  CPC ....... *B60W 60/0023* (2020.02); *G05D 1/0293* (2013.01); *H04W 4/46* (2018.02); *H04W 28/24* (2013.01); *H04W 72/085* (2013.01); *B60W 2556/65* (2020.02); *B60W 2754/10* (2020.02)

(56) References Cited

U.S. PATENT DOCUMENTS

| | | | |
|---|---|---|---|
| 2018/0338001 A1 | 11/2018 | Pereira Cabral et al. | |
| 2018/0366005 A1* | 12/2018 | Seenumani | B61L 15/0018 |
| 2019/0164420 A1* | 5/2019 | Wendt | G05D 1/0293 |
| 2019/0232962 A1 | 8/2019 | Broll et al. | |
| 2019/0236959 A1* | 8/2019 | Belapurkar | G06Q 20/325 |

FOREIGN PATENT DOCUMENTS

| | | | | |
|---|---|---|---|---|
| CN | 108877256 A | 11/2018 | | |
| CN | 109041248 A | 12/2018 | | |
| CN | 109360409 A | 2/2019 | | |
| CN | 110036423 A | 7/2019 | | |
| DE | 102014200804 A1 | 7/2015 | | |
| DE | 102016003252 A1 | 10/2016 | | |
| DE | 102016003433 A1 * | 10/2016 | | |
| DE | 102016003433 A1 | 10/2016 | | |
| EP | 1426911 A1 | 6/2004 | | |
| EP | 3418844 A1 | 12/2018 | | |
| JP | 2011219056 A | 11/2011 | | |
| JP | 2013164758 A | 8/2013 | | |
| KR | 20170047043 A | 5/2017 | | |
| SE | 1550385 A1 | 11/2016 | | |
| SE | 1550389 A1 | 11/2016 | | |
| SE | 1651657 A1 | 7/2018 | | |
| WO | 2018054520 A1 | 3/2018 | | |
| WO | WO-2019081026 A1 * | 5/2019 | | H04W 28/24 |
| WO | WO-2019081027 A1 * | 5/2019 | | H04W 28/0268 |

OTHER PUBLICATIONS

Office Action for Korean Patent Application No. 10-2020-0113905; dated Apr. 16, 2021.
3GPP TSG-SA WG1 Meeting #83; LS on Requirements to enable Predictive QoS for Automotive industry; Aug. 2018; West Palm Beach, Florida.
Search Report for European Patent Application No. 19196178.8; dated Feb. 19, 2020.
Office Action for Chinese Patent Application No. 202010941633.8; dated Apr. 1, 2022.

* cited by examiner

METHOD, COMPUTER PROGRAM, AND APPARATUS FOR ADAPTING A SPEED OF VEHICLES IN A PLATOON, VEHICLE, TRAFFIC CONTROL ENTITY

PRIORITY CLAIM

This patent application claims priority to European Patent Application No. 19196178.8, filed 9 Sep. 2019, the disclosure of which is incorporated herein by reference in its entirety.

SUMMARY

Illustrative embodiments relate to a transportation vehicle, a traffic control entity, a method, a computer program, and an apparatus for adapting a speed of transportation vehicles in a platoon, more specifically, but not exclusively, to a concept for controlling a speed of transportation vehicles in a platoon based on a time series of future minimum inter-vehicular distances and a fuel consumption of the transportation vehicles of the platoon.

BRIEF DESCRIPTION OF THE DRAWINGS

Disclosed embodiments will be described using the following non-limiting apparatuses or methods or computer programs or computer program products by way of example only, and with reference to the accompanying figures, in which.

DETAILED DESCRIPTION

Figure 1:
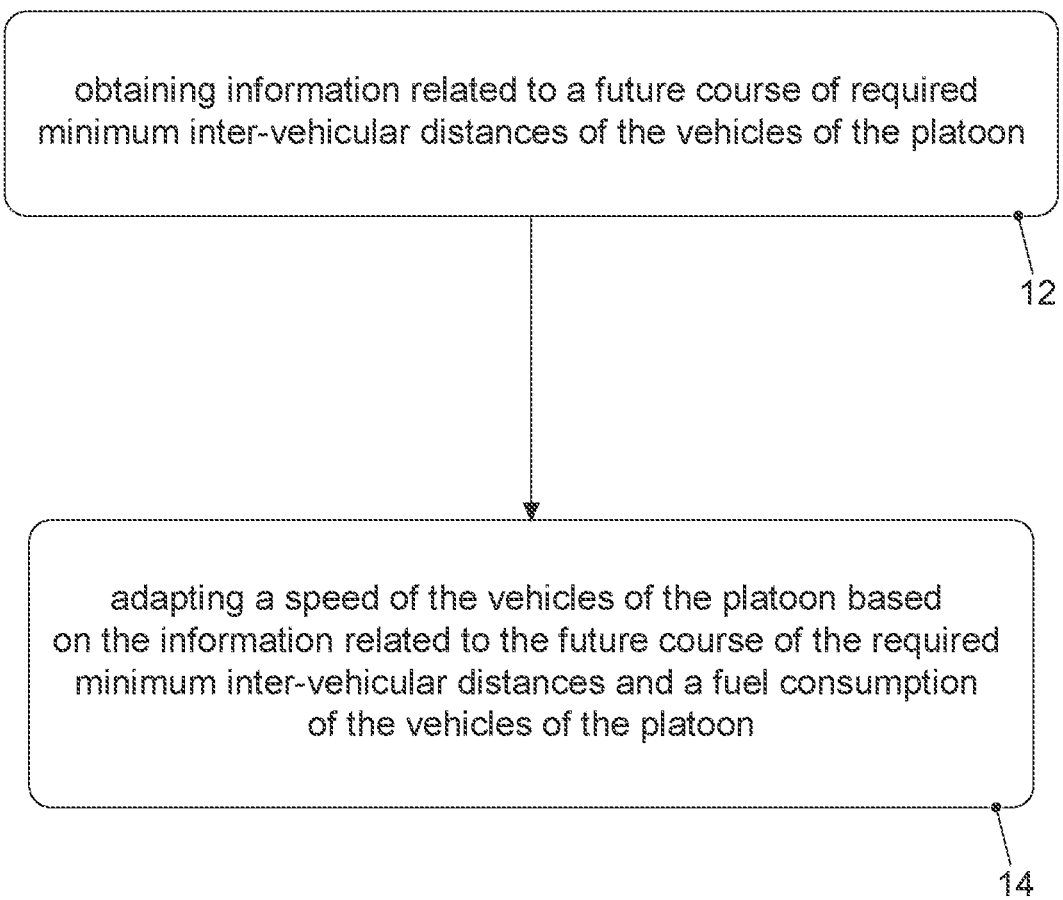
FIG. 1 illustrates a block diagram of an exemplary embodiment of a method for adapting a speed of transportation vehicles in a platoon.

Within the concept of Agile Quality of Service Adaptation (AQoSA), an application supported by a communication system adapts its settings to the foreseen quality of service (QoS). It is especially important when the application in question is a safety-related time-critical application such as High-Density Platooning (HDPL), where inter-vehicle distances (IVDs) are below 15 m. At this IVD, due to very low detection and reaction available time, sensor systems need to be supported by information transmitted by other transportation vehicles. The quality of the communication link is therefore critical as the performance of the application is strongly dependent on it. To cope with variation on the quality of service, AQoSA provides information on the future quality of the link.

Document EP 1 426 911 A1 provides a separation module for calculating a minimum spacing for several objects, such as between two transportation vehicles. Document DE 10 2014 200 804 A1 describes a group of transportation vehicles being formed. Once the group has been formed, a central coordinator is selected from the group who sets a group speed for the group. Based on the group speed, an upper and a lower speed threshold are set for the group. Speeds of the transportation vehicles of the group members are synchronized by car-2-car communication so that the transportation vehicles of the group members accelerate and simultaneously reach the upper speed threshold within a predetermined period of time. The lower and upper speed thresholds are communicated to the group members.

Document WO 2018/054520 A1 relates to a method for determining a dynamic transportation vehicle distance between a following transportation vehicle and a preceding transportation vehicle of a platoon, wherein a vehicle-to-vehicle (V2V) signal can be wirelessly transferred between the following transportation vehicle and the preceding transportation vehicle. A current maximum following-vehicle deceleration of the following transportation vehicle is determined and a current transfer time for transferring to the following transportation vehicle the information that the preceding transportation vehicle has initiated an emergency braking operation. A current maximum preceding-vehicle deceleration of the preceding transportation vehicle is determined. The dynamic transportation vehicle distance is determined from a transfer distance and from a braking distance difference, wherein the transfer distance indicates the distance traveled by the following transportation vehicle between the initiation of an emergency braking operation by the preceding transportation vehicle and the initiation of an emergency braking operation by the following transportation vehicle. The transfer distance(s) depends on the current transfer time. The braking distance indicates a difference between a preceding-vehicle braking distance defined by the maximum preceding-vehicle deceleration and following-vehicle braking distance defined by the maximum following-vehicle deceleration.

Document US 2018/0366005 A1 describes a convoy management system and method determining an inter-vehicle spacing in a convoy formed from two or more transportation vehicles traveling together along one or more routes. Controllers onboard the two or more transportation vehicles are instructed to automatically change movement of at least one of the transportation vehicles in the convoy to maintain the inter-vehicle spacing. The inter-vehicle spacing is dynamically changed during movement of the convoy along the one or more routes.

There is a demand for an improved concept for controlling transportation vehicles in a platoon.

Disclosed embodiments are based on the finding that in the scope of adaptation to predictive quality of service applied to platooning, the minimum inter-vehicle distance (IVD) that the provided quality of service allows can be targeted. Targeting small IVD aims for reduced fuel consumption due to reduced air drag at such small IVDs. It is a finding that this adaptation requires to take into account the cost of reducing the IVD and the cost of increasing the IVD when the quality of service is not favorable anymore. In other words, it is a finding that the cost of the maneuvers of a platoon in terms of fuel consumption need to be considered together with estimated short-IVD-durations and their benefits. The cost of a maneuver may be considered a major limitation for platooning.

A predicted QoS (pQoS) may generally be used to plan a specific maneuver. A decision may be made regarding the feasibility of such maneuver and its cost or benefit. For instance, the benefit of driving 5 m IVD in terms of fuel spared per second for the whole platoon can be determined. An optimal time to operate a closing maneuver from an original IVD (e.g., 30 m) to the target IVD (5 m) can also be determined. Moreover, an opening maneuver, which is the maneuver to go back to the original IVD, can be computed and evaluated. Times and costs/benefits can be compared to the available pQoS. It is a further finding that a drawback of such an approach is that there is no "in-between". If the QoS does not meet the requirements long enough, the application will not perform HDPL. Disclosed embodiments may derive a dynamic plan to adapt to a pQoS time series, so that an improved or even optimal target distance planning can be achieved to get the most out of the predicted QoS.

Disclosed embodiments provide a method for adapting a speed of transportation vehicles in a platoon. The method comprises obtaining information related to a future course of required minimum inter-vehicular distances of the transportation vehicles of the platoon. The method further comprises adapting a speed of the transportation vehicles of the platoon based on the information related to the future course of the required minimum inter-vehicular distances, and a fuel consumption of the transportation vehicles of the platoon. By taking the fuel consumption into account a higher overall fuel efficiency of the platoon and the respective maneuvers can be achieved.

The information related to the future course of required minimum inter-vehicular distances of the transportation vehicles of the platoon may be based on a predicted quality of service, pQoS, of a communication link between the transportation vehicles of the platoon. Disclosed embodiments may provide fuel efficient maneuvering of a platoon taking into account pQoS.

For example, the adapting of the speed of the transportation vehicles may comprise keeping at least the required minimum inter-vehicular distances of the transportation vehicles of the platoon, such that reliable safety requirements are maintained.

Moreover, during the adapting, an actual inter-vehicular distance may always be greater than the required minimum inter-vehicular distances of the transportation vehicles of the platoon. Therewith a further safety margin may be available, e.g., for the case of a sudden QoS drop in on communication links.

At least in some exemplary embodiments the obtaining of the information may comprises obtaining a pQoS time series with a confidence interval from a communications system used for inter-vehicular communication by the transportation vehicles of the platoon. The confidence interval may enable a more reliable maneuver planning for the platoon.

Furthermore, the method may comprise determining, from a bound of the pQoS time series, a minimum drivable inter-vehicle distance time series. Such a bound may, for example, correspond to an upper bound (e.g., latency, packet inter-reception time, round trip delay) or a lower bound (e.g., data rate). Disclosed embodiments may enable IVD-adaptation based on pQoS of the communication links between the transportation vehicles.

The method may further comprise determining the minimum drivable inter-vehicle distance time series for equal-length time intervals. An inter-vehicle distance time series for equal-length time intervals may enable a continuous IVD and transportation vehicle speed adaptation during operation of the platoon.

For example, a target distance for a time interval may be iteratively computed based on the minimum drivable inter-vehicle distance time series for the equal-length time intervals and a fuel consumption of the transportation vehicles of the platoon. Disclosed embodiments may enable continuous and smooth adaptation of the target distances between the transportation vehicles of the platoon.

In further exemplary embodiments an air drag of the transportation vehicles of the platoon may be considered and further improvement of the resulting maneuvers with respect to fuel consumption may be achieved.

Disclosed embodiments provide an apparatus for adapting a speed of transportation vehicles of a platoon. The apparatus comprises one or more interfaces for communicating with one or more transportation vehicles of the platoon and a mobile communication system. The apparatus further comprises a control module configured to carry out or to perform one of the methods described herein.

A transportation vehicle comprising an exemplary embodiment of the apparatus is another exemplary embodiment. In a further exemplary embodiment the transportation vehicle can be configured to assume the role of a platoon member or leader in the platoon. Disclosed embodiments may provide a flexible implementation for speed adaptation processing in a platoon. For example, a traffic control entity may comprise an exemplary embodiment of the apparatus, e.g., implemented in a control center or a smart traffic component such as a traffic light.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for adapting a speed of transportation vehicles in a platoon. The method 10 comprises obtaining 12 information related to a future course of required minimum inter-vehicular distances of the transportation vehicles of the platoon. The method further comprises adapting 14 a speed of the transportation vehicles of the platoon based on the information related to the future course of the required minimum inter-vehicular distances, and a fuel consumption of the transportation vehicles of the platoon.

A platoon of transportation vehicles comprises two or more transportation vehicles. A transportation vehicle may correspond to any conceivable method or mechanism for transportation, e.g., a car, a bike, a motorbike, a van, a truck, a bus, a ship, a boat, a plane, a train, a tram, etc. To enable save operation of the platoon the transportation vehicles need to keep a minimum IVD. For example, considering an emergency brake situation all transportation vehicles of the platoon should be able to reach a stand-still without any collision and with keeping a minimum distance to the transportation vehicle in front at stillstand. To achieve this, multiple factors come into play, the deceleration capabilities of the transportation vehicles, the speed of the transportation vehicles and also any communication quality and delay of the communication links between the transportation vehicles. Moreover, although a minimum IVD may be available, fuel consumption of the transportation vehicles and hence an efficiency of their driving states and maneuvers are critical for the overall efficiency of the platoon. Aggressive acceleration and braking maneuvers may keep the transportation vehicles as close to the minimum IVD as possible, however, such maneuvers are fuel and resource consuming and may negatively influence an overall efficiency. The disclosed embodiments detailed in the following describe methods on how to determine speed adaptations within a platoon considering the fuel consumption of the transportation vehicles and the overall platoon efficiency.

Figure 2:
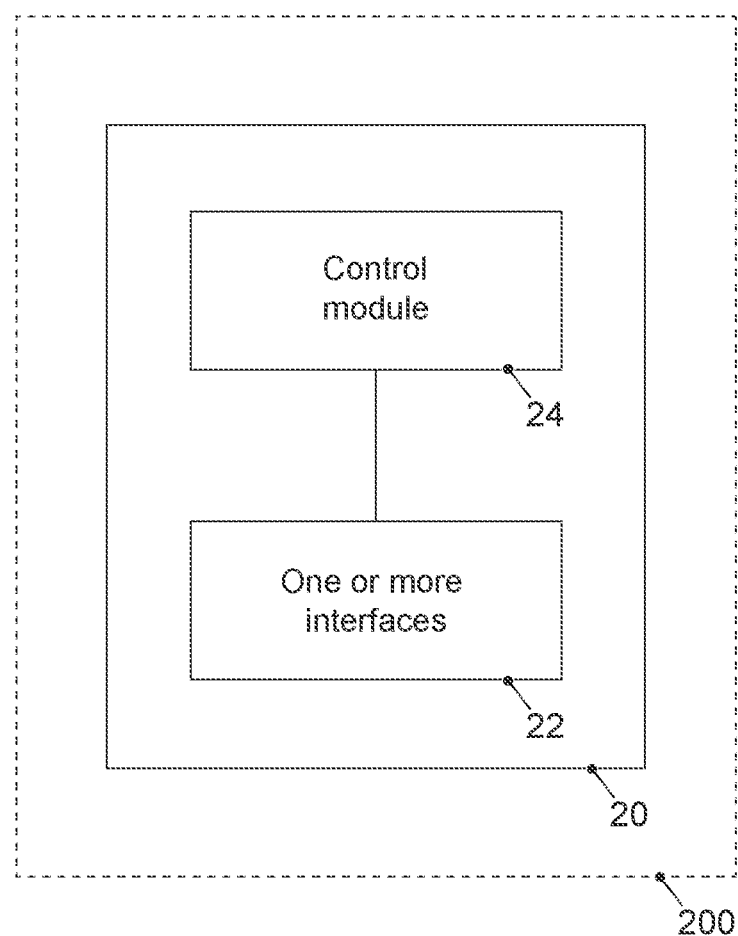
FIG. 2 illustrates a block diagram of an exemplary embodiment of an apparatus for adapting a speed of transportation vehicles in a platoon.

FIG. 2 illustrates a block diagram of an apparatus 20 for adapting a speed of transportation vehicles in a platoon. The apparatus 20 comprises one or more interfaces 22 for communicating with one or more transportation vehicles of the platoon and a mobile communication system. The apparatus 20 further comprises a control module 24, which is coupled to the one or more interfaces 22, and which is configured to perform one of the methods 10 described herein.

FIG. 2 further depicts as optional components further disclosed embodiments of an entity 200 which comprises an exemplary embodiment of the apparatus 20. Such an entity 200 could, for example, be a transportation vehicle or a traffic control entity (e.g., a (smart) traffic light or a platoon control center). For example, the transportation vehicle could be part of the platoon, e.g., assuming the role of a platoon member in the platoon or assuming the role of a platoon leader in the platoon.

The apparatus 20 and the entity 200 (e.g., the transportation vehicles of the platoon) may communicate through a mobile communication system. The mobile communication system may, for example, correspond to one of the Third Generation Partnership Project (3GPP)-standardized mobile communication networks, where the term mobile communication system is used synonymously to mobile communication network. The messages (input data, measured data, control information) may hence be communicated through multiple network nodes (e.g., internet, router, switches, etc.) and the mobile communication system, which generates delay or latencies considered in disclosed embodiments.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, exemplary embodiments may provide a mobile communication system comprising two or more mobile transceivers/vehicles 200 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 200 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatus 20 may be comprised in a server, a base station, a NodeB, a UE, a relay station, or any service coordinating network entity in exemplary embodiments. It is to be noted that the term network component may comprise multiple sub-components, such as a base station, a server, etc.

In exemplary embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information, input data, control information, further information messages, etc.

As shown in FIG. 2 the respective one or more interfaces 22 is coupled to the respective control module 24 at the apparatus 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/vehicles 200 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 22 can be configured to wirelessly communicate in the mobile communication system. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

An application for the adaptation of IVD or the speed of the transportation vehicles to pQoS in exemplary embodiments is High-Density Platooning (HDPL), where inter-vehicle distances (IVDs) are below 15 m. At this IVD, due to very low detection and reaction times available, sensor systems need to be supported by the reliable exchange of information with other transportation vehicles. The quality of the communication link is therefore critical as the performance of the application is strongly dependent on it. To allow the application to cope with variations on the quality of service, pQoS may provide information on a future quality of the link. This information may come with a prediction horizon, that is the delta time in the future for which the predicted value is applicable. The predicted QoS parameter for HDPL can be the packet inter-reception ratio or time (PIR), which is basically the expected time between two valid communication messages within a pair of communication partners. In some exemplary embodiments the pQoS comprises the packet inter-reception time or PIR. For example, the PIR may indicate a round trip time of a data packet such as the time between transmitting a data packet by a transceiver and reception of a response to the data packet at the transceiver. The information related to the future course of required minimum inter-vehicular distances of the transportation vehicles of the platoon may be based on a predicted quality of service, pQoS, of a communication link between the transportation vehicles of the platoon. The obtaining 12 may comprise obtaining a pQoS time series with a confidence interval from a communications system used for inter-vehicular communication by the transportation vehicles of the platoon.

Figure 3:
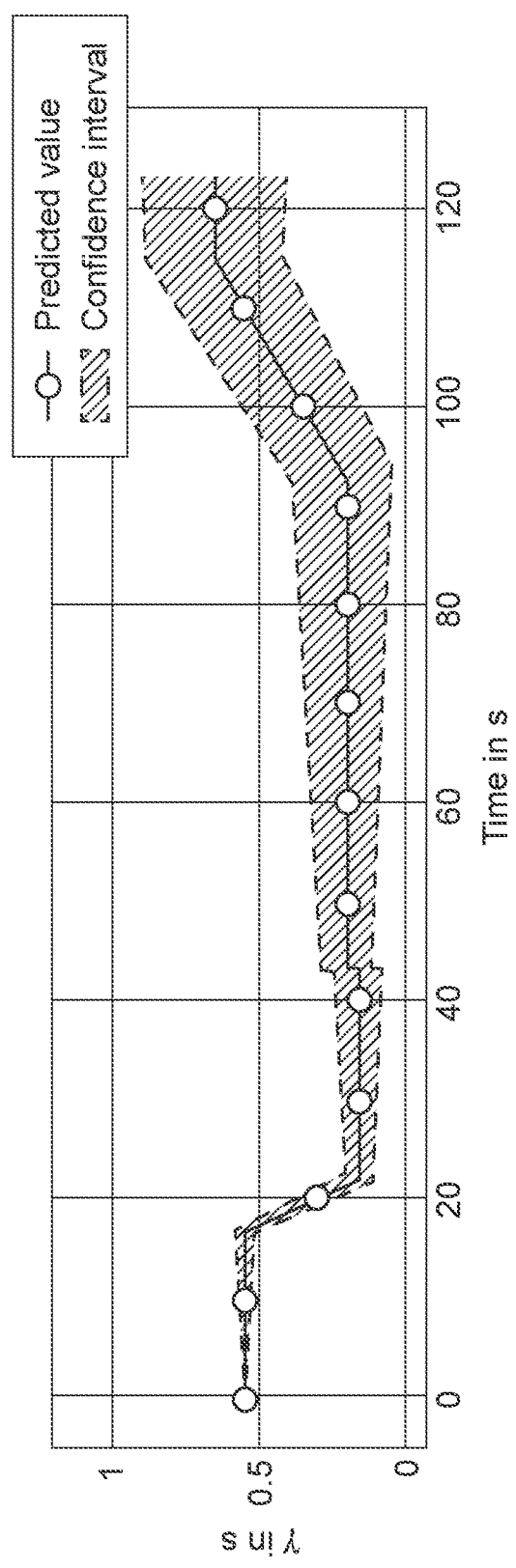
FIG. 3 illustrates a view chart of a time series of a predicted packet inter-reception time with a confidence interval in an exemplary embodiment.

FIG. 3 illustrates a view chart of a time series of a predicted packet inter-reception time with a confidence interval in an exemplary embodiment. FIG. 3 depicts an example of a PIR, γ, time series. The PIR is given in seconds over a time interval of about 120 s with the displayed confidence interval.

In disclosed embodiments the adaptation of the distance may be carried out by obtaining iteratively the target distance as a function of the pQoS time series. The first operation may be to translate the pQoS time series into the minimum drivable distance, in a functional safety point of view. For example, a functional relationship between the pQoS and an IVD may be determined by simulation or measurements. Once enough data relating pQoS, minimum IVD and potential parameters of the transportation vehicles (maximum deceleration and speed) is available regression methods can be used to determine a functional relationship. The functional relationship may hence be based on simulations, measurements, and/or historical data.

The adapting may comprise keeping at least the required minimum inter-vehicular distances of the transportation vehicles of the platoon. The adapting may be carried out conservatively in exemplary embodiments, i.e., in a way to rather have a larger IVD than an IVD below minimum. During the adapting, an actual inter-vehicular distance may always be greater than the required minimum inter-vehicular distances of the transportation vehicles of the platoon.

Figure 4:
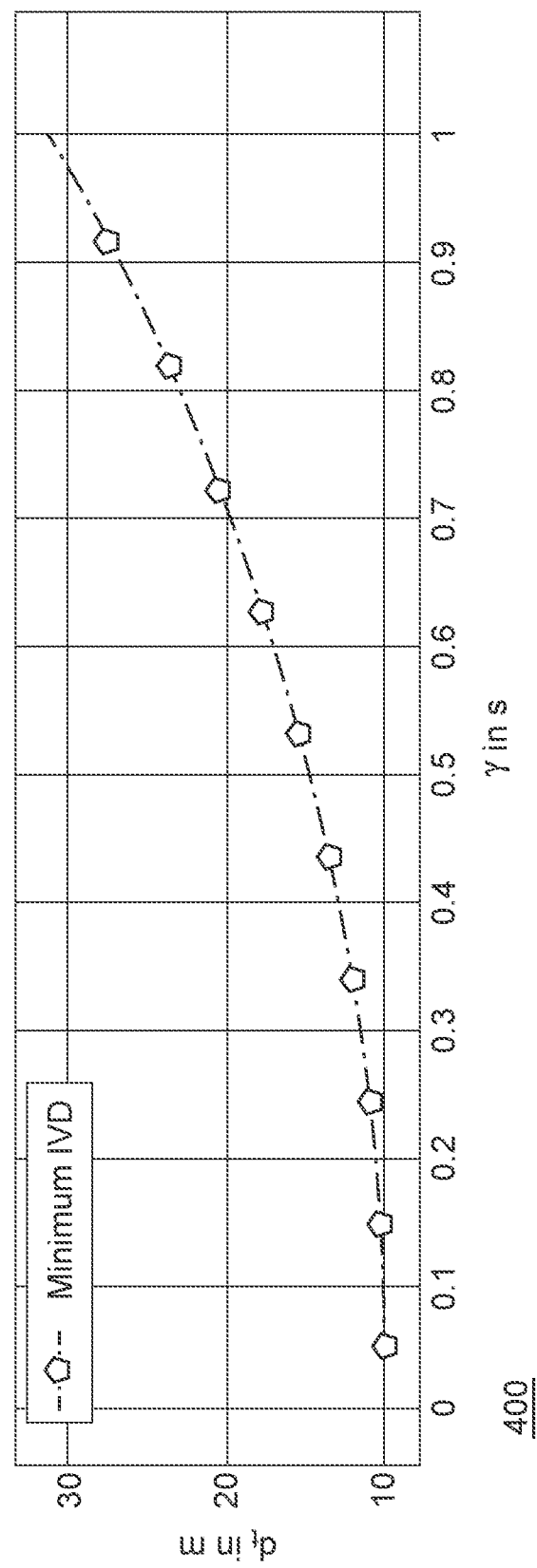
FIG. 4 illustrates a relationship between packet inter-reception time and minimum inter-vehicle distance in an exemplary embodiment.
Figure 5:
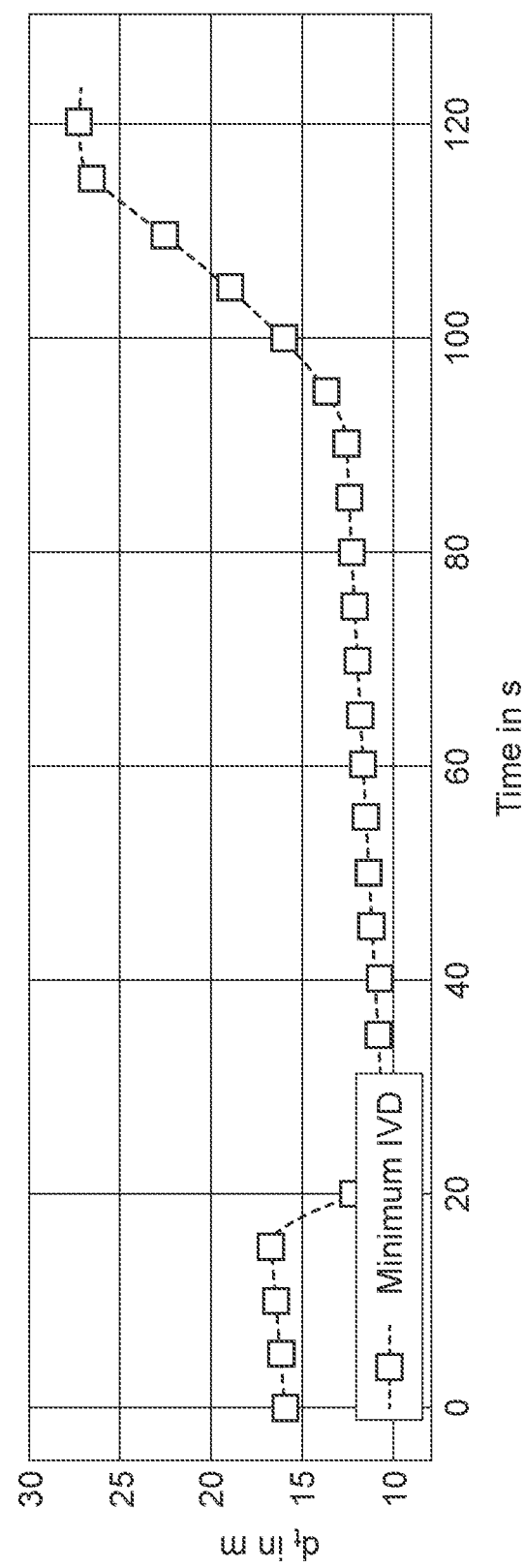
FIG. 5 illustrates a minimum inter-vehicle distance time series in an exemplary embodiment.

FIG. 4 illustrates a relationship between packet inter-reception time and minimum inter-vehicle distance in an exemplary embodiment. The PIR is given in s and the minimum IVD, dt, is shown in m. FIG. 5 illustrates the minimum IVD time series resulting in this disclosed embodiment, i.e., using the functional relationship of FIG. 4 to translate the PIR of FIG. 3 into a minimum IVD for the same time interval.

The minimum drivable IVD distance time series is determined from a bound of the pQoS time series. Such a bound can be an upper or a lower bound depending on a key performance indicator (KPI) used. For example, latency and PIR may be used to determine an upper bound whereas data rate may be used as a lower bound.

Figure 6:
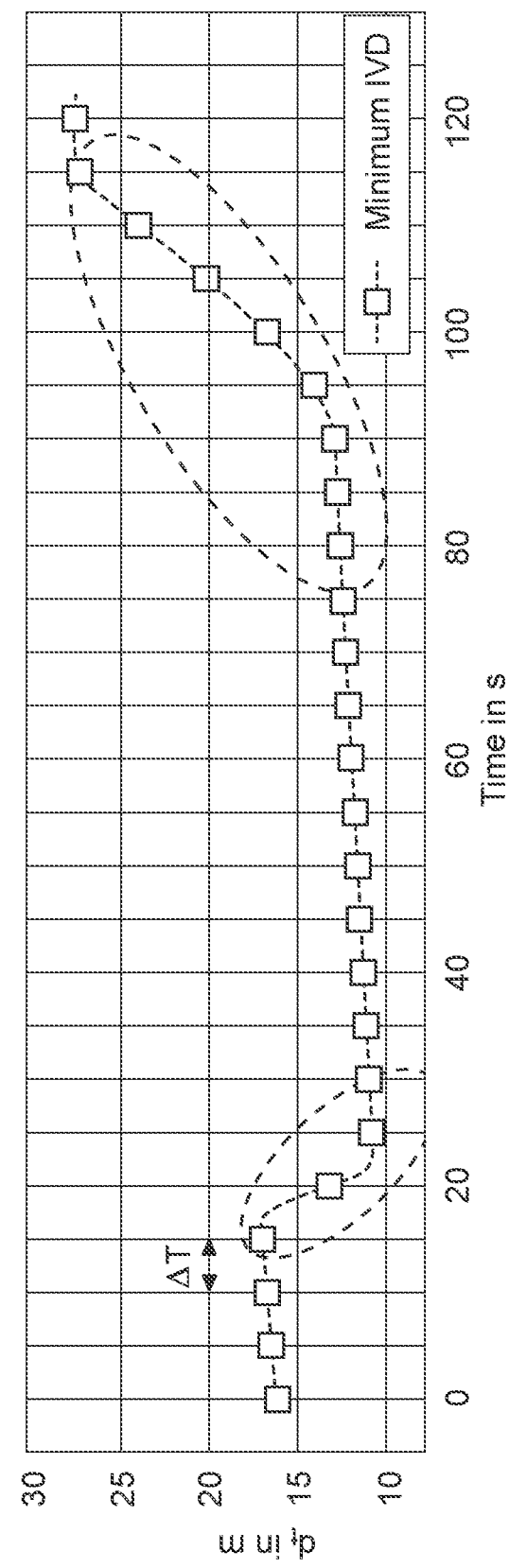
FIG. 6 shows a division into equal length time intervals of a minimum inter-vehicle distance time series in an exemplary embodiment.
Figure 7:
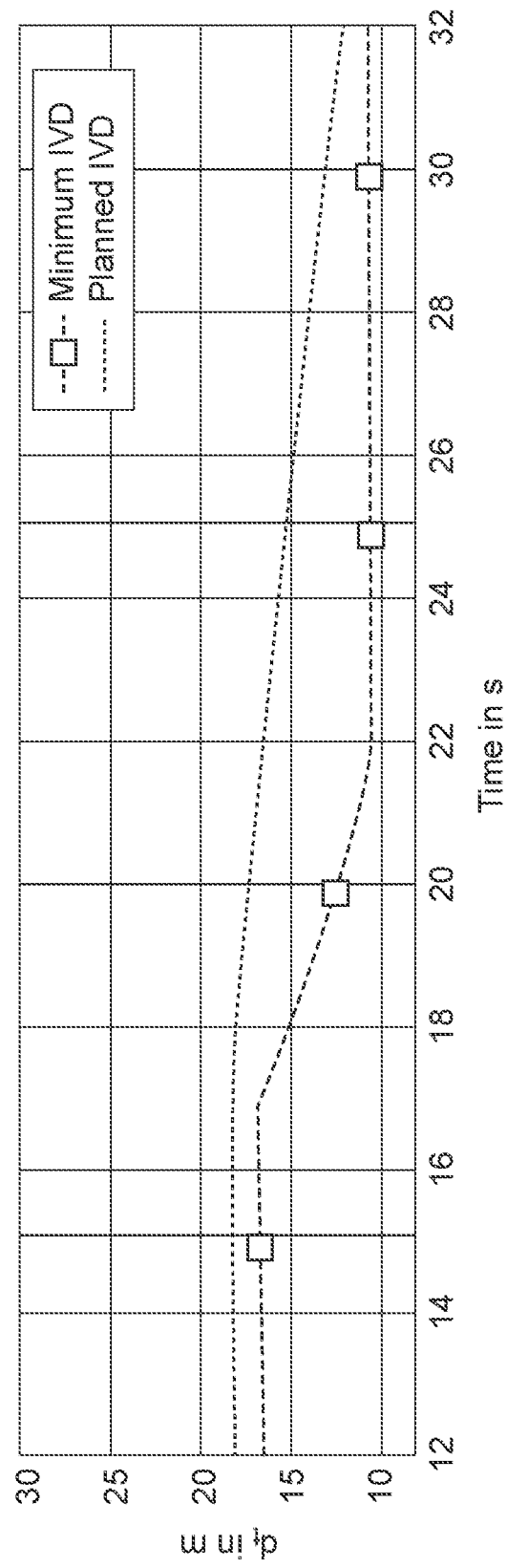
FIG. 7 shows a first magnified section of FIG. 6.
Figure 8:
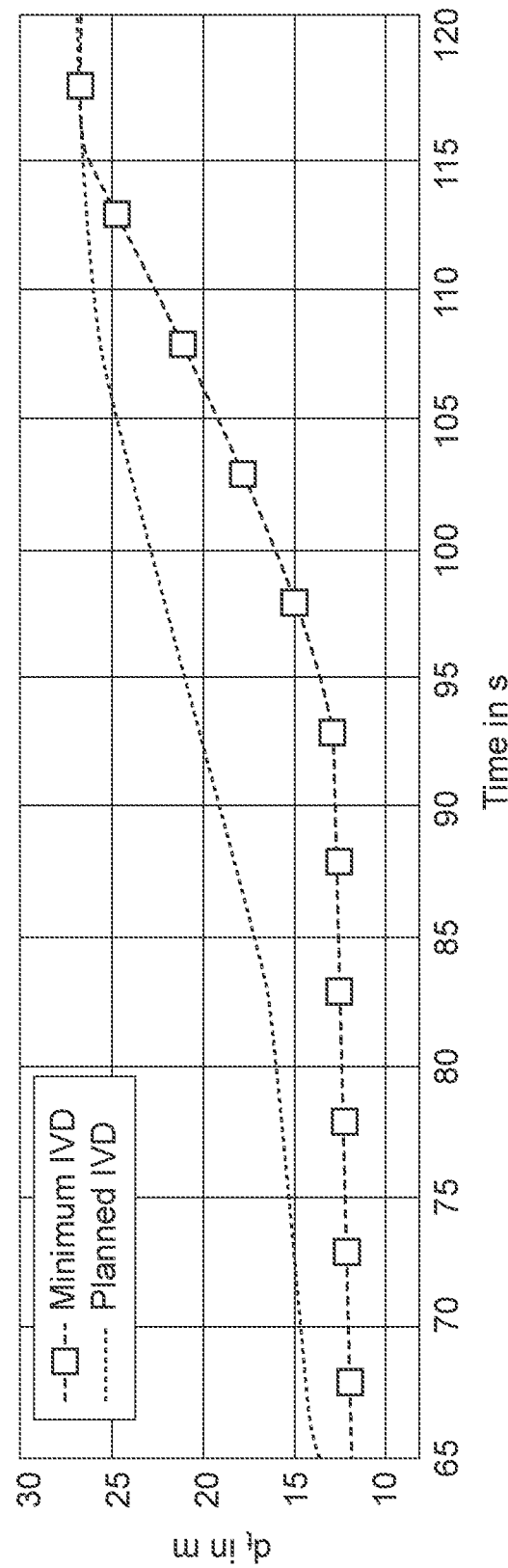
FIG. 8 shows a second magnified section of FIG. 6.

In an exemplary embodiment the obtained minimum IVD time series is then divided into smaller units of fixed size. FIG. 6 shows a division into equal length time intervals ΔT of a minimum inter-vehicle distance time series in an exemplary embodiment. The ellipses in FIG. 6 indicate time intervals in which the IVD changes and which are displayed in greater detail in FIGS. 7 and 8. FIG. 7 shows a first magnified section of FIG. 6 around 13 s-32 s, and FIG. 8 shows a second magnified section around 75 s-118 s.

The method then iteratively finds the target distance that minimizes the relative consumption whilst respecting the minimum IVD from the previous operation. The method 10 comprises iteratively computing a target distance for a time interval based on the minimum drivable inter-vehicle distance time series for the equal-length time intervals and a fuel consumption of the transportation vehicles of the platoon. The method may further take into account an air drag of the transportation vehicles of the platoon. In disclosed embodiments the IVDs in the platoon might not always correspond to the minimum IVDs but the one with reduced or even minimized fuel consumption. The total relative consumption may then be evaluated for the total provided time series, if it is positive, the maneuver is not performed. The whole method 10 is performed periodically in some exemplary embodiments, adapting the plan to the new received pQoS time series.

Figure 9:
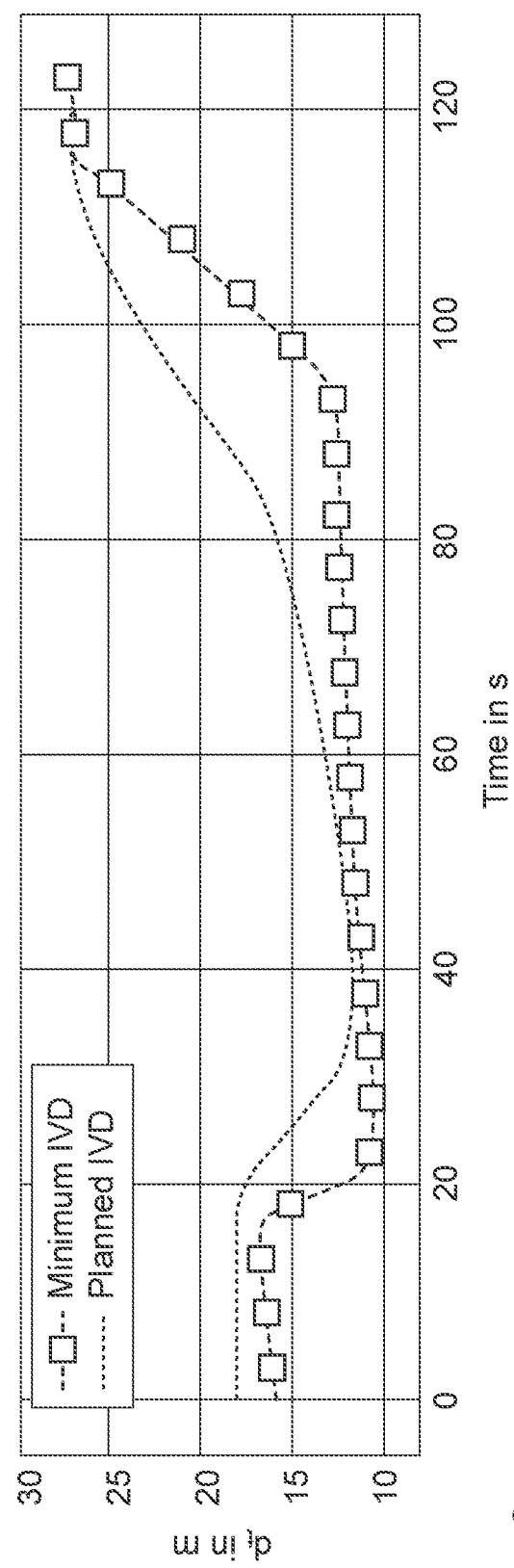
FIG. 9 illustrates minimum and planned inter-vehicle distances in an exemplary embodiment.

FIG. 9 illustrates minimum and planned inter-vehicle distances in an exemplary embodiment. It can be seen how the planned IVD is smoothed compared to the minimum IVD.

In some disclosed embodiments one target small IVD may be considered. If the prediction horizon of the pQoS or the favorable quality of service is too short, the maneuver might not be performed. Another application where the adaptation to link quality is useful is traffic control in urban platooning. In this case, the ultimate goal may be a transportation vehicle flow efficiency. The IVD may also be dependent on the link quality, and the fuel efficiency may be a secondary objective. Disclosed embodiments may consider the relationship between the relative fuel consumption and the maneuvering time for any start and end IVD. Disclosed embodiments may provide the minimum drivable IVD as a function of some QoS KPI, such as the packet inter-reception time (PIR).

For another exemplary embodiment, the method 10 for evaluating an inter-vehicle distance adaptation plan may be summarized as follows:
1. Obtain a predictive quality of service time series with a confidence interval from a communication system (FIG. 3);
2. Translate the upper bound PQoS time series into a minimum drivable inter vehicle distance (mIVD) time series (FIGS. 4,5);
3. Divide this mIVD time series into same length time intervals (FIG. 6);
4. Iteratively compute the target distance for the timestep using the target distance of the previous timestep and the fuel consumption values taking the air drag into account (FIGS. 7, 8, 9);
5. Evaluate the inter-vehicle distance adaptation plan in terms of fuel consumption.

The translation from PQoS to mIVD can be done using known functional safety results (FIG. 4, 5). The optimization/improvement of the target distance for each timestep can be done using the relationship between fuel consumption and different maneuvers (FIG. 7, 8, 9). For example, the process or method 10 is repeated at each reception of pQoS time series (operation at 1), so that the planning is updated at each new input.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by a device having methods or mechanisms for performing each of the respective operations of these methods.

LIST OF REFERENCE SIGNS

10 method for adapting a speed of transportation vehicles in a platoon
12 obtaining information related to a future course of required minimum inter-vehicular distances of the transportation vehicles of the platoon
14 adapting a speed of the transportation vehicles of the platoon based on the information related to the future course of the required minimum inter-vehicular distances, and a fuel consumption of the transportation vehicles of the platoon
20 apparatus for adapting a speed of transportation vehicles in a platoon
22 one or more interfaces
24 control module
200 Transportation vehicle, traffic control entity

The invention claimed is:

1. An apparatus for adapting a speed of transportation vehicles of a platoon, the apparatus comprising:
   one or more interfaces for communicating with one or more transportation vehicles of the platoon and a mobile communication system; and
   a control module configured to control the adaptation of the speed of transportation vehicles in the platoon, wherein the control includes
      obtaining information related to a future course of required minimum inter-vehicular distances of the transportation vehicles of the platoon; and
      adapting the speed of the transportation vehicles of the platoon based on the information related to the future course of the required minimum inter-vehicular distances, and a cost of fuel consumption of the transportation vehicles of the platoon,
   wherein the information related to the future course of required minimum inter-vehicular distances of the transportation vehicles of the platoon is based on a predicted quality of service (pQoS) of a communication link between the transportation vehicles of the platoon, and
   wherein the cost of fuel consumption includes a cost of fuel consumption when adapting the speed of the transportation vehicles to achieve the minimum inter-vehicular distance between the transportation vehicles, a cost of fuel consumption when the transportation vehicles are traveling at the minimum inter-vehicular distance taking into account fuel savings achieved from reduced air drag of the transportation vehicles at the minimum inter-vehicular distance, and a cost of fuel consumption when the adapting the speed of the transportation vehicles to achieve a first distance greater than the minimum inter-vehicular distance when the pQoS is below a predetermined threshold level.

2. The apparatus of claim 1, wherein the adapting comprises keeping at least the required minimum inter-vehicular distances of the transportation vehicles of the platoon.

3. The apparatus of claim 1, wherein, during the adapting, an actual inter-vehicular distance is always greater than the required minimum inter-vehicular distances of the transportation vehicles of the platoon.

4. The apparatus of claim 1, wherein the obtaining comprises obtaining a pQoS time series with a confidence interval from a communications system used for inter-vehicular communication by the transportation vehicles of the platoon, and wherein the minimum inter-vehicular distance is directly proportional to the confidence interval of the pQoS time series.

5. The apparatus of claim 4, wherein the control module controls determining, from a bound of the pQoS time series, a minimum drivable inter-vehicle distance time series, the bound including at least one of an upper bound and a lower bound, the upper bound including at least one of latency and packet inter-reception time, and the lower bound including data rate.

6. The apparatus of claim 5, wherein the control module controls determining the minimum drivable inter-vehicle distance time series for equal-length time intervals.

7. The apparatus of claim 6, wherein the control module controls iteratively computing a target distance for a time interval based on the minimum drivable inter-vehicle distance time series for the equal-length time intervals and the cost of fuel consumption of the transportation vehicles of the platoon.

8. A transportation vehicle comprising the apparatus of claim 1.

9. The transportation vehicle of claim 8, configured to assume the role of a platoon member in the platoon.

10. The transportation vehicle of claim 8, configured to assume the role of a platoon leader in the platoon.

11. A traffic control entity comprising the apparatus of claim 1.

12. A non-transitory computer program having a program code for performing a method for adapting a speed of transportation vehicles in a platoon, when the computer program is executed on a computer, a processor, or a programmable hardware component, the method comprising:
obtaining information related to a future course of required minimum inter-vehicular distances of the transportation vehicles of the platoon; and
adapting a speed of the transportation vehicles of the platoon based on
the information related to the future course of the required minimum inter-vehicular distances, and
a cost of fuel consumption of the transportation vehicles of the platoon,
wherein the information related to the future course of required minimum inter-vehicular distances of the transportation vehicles of the platoon is based on a predicted quality of service (pQoS) of a communication link between the transportation vehicles of the platoon, and
wherein the cost of fuel consumption includes a cost of fuel consumption when adapting the speed of the transportation vehicles to achieve the minimum inter-vehicular distance between the transportation vehicles, a cost of fuel consumption when the transportation vehicles are traveling at the minimum inter-vehicular distance taking into account fuel savings achieved from reduced air drag of the transportation vehicles at the minimum inter-vehicular distance, and a cost of fuel consumption when the adapting the speed of the transportation vehicles to achieve a first distance greater than the minimum inter-vehicular distance when the pQoS is below a predetermined threshold level.

13. A method for adapting a speed of transportation vehicles in a platoon, the method comprising:
obtaining information related to a future course of required minimum inter-vehicular distances of the transportation vehicles of the platoon; and
adapting a speed of the transportation vehicles of the platoon based on
the information related to the future course of the required minimum inter-vehicular distances, and
a cost of fuel consumption of the transportation vehicles of the platoon,
wherein the information related to the future course of required minimum inter-vehicular distances of the transportation vehicles of the platoon is based on a predicted quality of service (pQoS) of a communication link between the transportation vehicles of the platoon, and
wherein the cost of fuel consumption includes a cost of fuel consumption when adapting the speed of the transportation vehicles to achieve the minimum inter-vehicular distance between the transportation vehicles, a cost of fuel consumption when the transportation vehicles are traveling at the minimum inter-vehicular distance taking into account fuel savings achieved from reduced air drag of the transportation vehicles at the minimum inter-vehicular distance, and a cost of fuel consumption when the adapting the speed of the transportation vehicles to achieve a first distance greater than the minimum inter-vehicular distance when the pQoS is below a predetermined threshold level.

14. The method of claim 13, wherein the adapting comprises keeping at least the required minimum inter-vehicular distances of the transportation vehicles of the platoon.

15. The method of claim 13, wherein, during the adapting, an actual inter-vehicular distance is always greater than the required minimum inter-vehicular distances of the transportation vehicles of the platoon.

16. The method of claim 13, wherein the obtaining comprises obtaining a pQoS time series with a confidence interval from a communications system used for inter-vehicular communication by the transportation vehicles of the platoon, and wherein the minimum inter-vehicular distance is directly proportional to the confidence interval of the pQoS time series.

17. The method of claim 16, further comprising determining, from a bound of the pQoS time series, a minimum drivable inter-vehicle distance time series, the bound including at least one of an upper bound and a lower bound, the upper bound including at least one of latency and packet inter-reception time, and the lower bound including data rate.

18. The method of claim 17, further comprising determining the minimum drivable inter-vehicle distance time series for equal-length time intervals.

19. The method of claim 18, further comprising iteratively computing a target distance for a time interval based on the minimum drivable inter-vehicle distance time series for the equal-length time intervals and the cost of fuel consumption of the transportation vehicles of the platoon.

\* \* \* \* \*